Figure 1:
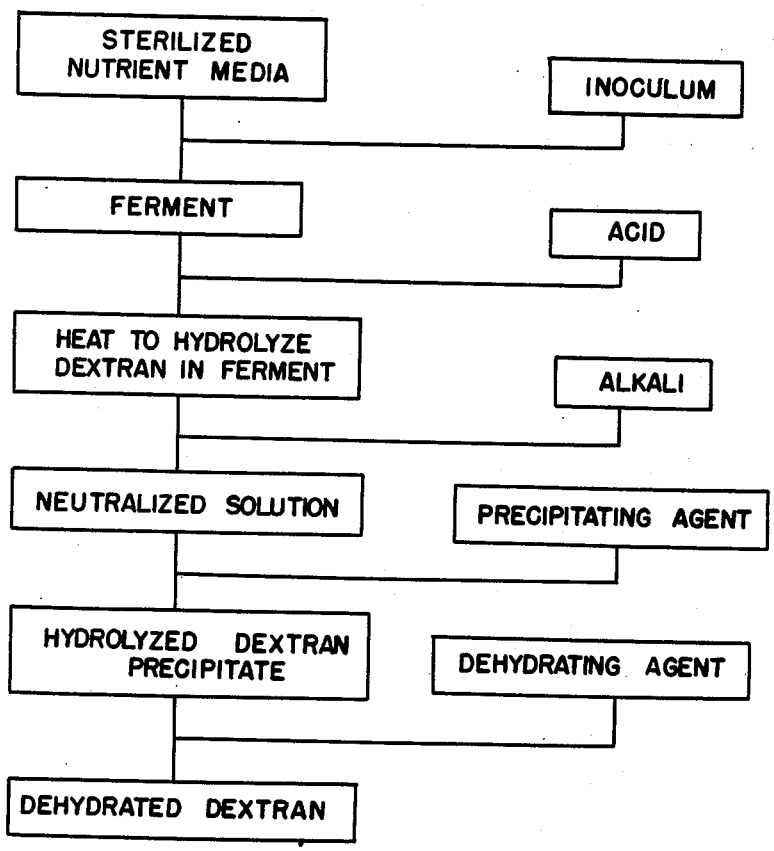
Figure 2:
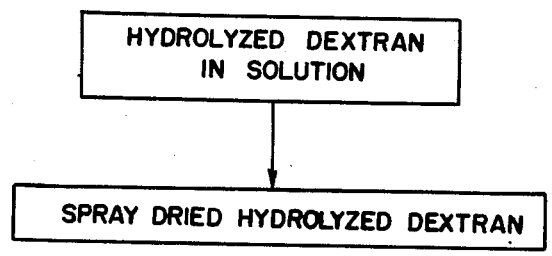

Patented Aug. 24, 1954

2,687,368

UNITED STATES PATENT OFFICE 2,687,368

HYDROLYSIS OF CRUDE DEXTRAN FERMENTATES

George S. Stoycos, Dayton, Ohio, assignor to The Commonwealth Engineering Company of Ohio, Dayton, Ohio, a corporation of Ohio Application August 6, 1951, Serial No. 240,580

9 Claims. (Cl. 195—31)

This invention relates to an improved hydrolyzed or partially depolymerized dextran and to a method of attaining the same.

This application is related to co-pending applications Serial No. 240,579 of Leo J. Novak and George Stoycos, filed August 6, 1951; Serial No. 240,581 of Leo J. Novak, filed August 6, 1951; and Serial No. 261,172 of Leo J. Novak and Marion D. Ford, filed December 12, 1951; all assigned to the same assignee as the present invention.

Gum dextran a high molecular weight polymer is produced by the action of micro-organisms such as Leuconostoc mesenteroides or Leuconostoc dextranicum on nutrient media containing a sucrose bearing material as refined sugar, raw sugar, molasses, etc. The bacterial action requires a period of sixteen to forty hours under temperature conditions of about 23° to 27° C. and during the course of the reaction the solution becomes highly viscous and the pH falls to about 3.9 to 4.1. This viscous aqueous solution is then treated with an alcohol to render impurities insoluble, and after a series of filtration steps, an excess of alcohol or other precipitating agent is added to secure high molecular weight dextran. This material will have a utility for many purposes, and if hydrolyzed to lower molecular weights in the range of 30,000 to 100,000 is effectively employed as a substitute for blood plasma.

It has been the practice when preparing hydrolyzed dextran for blood purposes, where purity and the absence of turbidity in solution are essential pre-requisites, to first purify the gum dextran and thereafter effect the hydrolytic action, a process which involves an excessive number of steps and an abnormal amount of equipment.

It is a primary object of this invention to provide a new and simplified process for obtaining hydrolyzed dextran.

It is an important object of this invention to provide a process for producing hydrolyzed dextran which eliminates the necessity of intermediate purification steps.

It is a particular object of this invention to provide a simplified process for producing hydrolyzed dextran while eliminating a greater proportion of impurities.

It is another object of this invention to provide a hydrolyzed dextran of improved purity.

It is also an object of this invention to provide a hydrolyzed dextran of improved and narrowed molecular weight range.

These and other allied objectives of the invention are attained by hydrolyzing under controlled conditions of time, temperature and acidity, the raw ferment attained from the bacterial action on the sucrose. This procedure has the effect of also degrading levans formed from the fructose of the sugar and proteins present thus rendering these materials more soluble and accordingly more readily separable from the hydrolyzed dextran in the subsequent precipitation step. Such procedure also results in a relatively low viscosity solution of dextran permitting more ready handling and saving of time in the filtration, decolorization and deionization steps which follow hydrolysis. Further since the use of washing materials such as the alcohols, for gum dextran, is not necessary the troublesome steps incident to removal of such solvent are avoided by the process of invention.

The invention will be more fully understood by reference to the accompanying flow sheet and following examples which are set forth as illustrations only and are not to be considered limitative of the invention.

Example I

In the practice of the invention the nutrient sucrose media is sterilized and after cooling immediately inoculated with a strain of Leuconostoc mesenteroides. The nutrient media preferably contain by weight:

| | Per cent |
|---|---|
| Casein hydrolysate, enzymatic | .5 |
| $K_2HPO_4$ | .5 |
| NaCl | .2 |
| Bacto-yeast extract | .1 |
| Sucrose (white granulated sugar) | 20 |
| $MnSO_4$ | .0022 |

The balance being water.

The preferred bacteria species is Leuconostoc mesenteroides strain #683, although Leuconostoc mesenteroides strain #535, as well as ELAI Leuconostoc dextranicum strain may be suitably employed.

To the finished ferment there is then added $H_2O$ and a mineral acid, HCl or $H_2SO_4$, in sufficient amount to give the resultant solution a pH of about 1.04. The water added may vary but should be sufficient to materially reduce the viscosity of the solution, which solution as noted must be highly acid. The acidified solution is then heated to a temperature of about 85° C. for about 35–40 minutes. At the end of this heating period a caustic solution is added to the hot solution to bring the pH thereof to 6.8–7.0, and the solution may then be cooled to a temperature in the range of about 35° to 40° C. The cooled solution is then decolorized, deionized and clarified. The decoloration is effected by passing the solution through a charcoal bed, the deionization being effected by passing through a bed or column containing any efficient anionic and cationic exchange mineral or resin, further clarification taking place through a diatomaceous earth bed.

The hydrolyzed dextran solution can then be spray dried or have added to it an equal weight of isopropyl alcohol which precipitates the dextran from the aqueous solution. The precipitated dextran is then dehydrated with acetone and isopropyl alcohol, and finally dried under vacuum conditions at 50° to 80° C. The final yield of hydrolyzed dextran is approximately 35% of the theoretical, the theoretical yield being approximately 47% of the original sucrose weight in the nutrient media.

The removable impurities remain in the filtrate and may be discarded.

*Example II*

The procedure was the same as in Example I except that the raw ferment was acidified with HCl to a normality of 5 and the ferment heated at about 37° C. for 9 hours. No coloration was present after this hydrolytic action and the final yield was equivalent to that set forth in Example I.

*Example III*

The procedure was the same as in the foregoing examples except that the raw ferment was acidified with HCl to a normality of 2 and the solution heated at 37° C. for 26 hours. No coloration was present upon completion of the hydrolysis and the yield was equivalent to that set forth in Examples I and II.

*Example IV*

The procedure was the same as in the foregoing examples except that the raw ferment was acidified to a normality of one with $H_2SO_4$. The solution was heated at 37° C. for 60 hours and no coloration was present upon completion of the hydrolysis. The yield was similar to that set forth in the prior examples.

*Example V*

The procedure was the same as in Example III, that is, the raw ferment was acidified with HCl to a normality of 2. The solution was then heated to 50° C. for about 24 hours. Upon completion of the hydrolysis the solution had a very slight coloration, requiring a longer decolorizing period. Otherwise the yield was the same as in the previous examples.

Other precipitating agents may be used in the process of invention, for example, methyl or ethyl alcohol, acetone or dioxane may be substituted for the isopropyl alcohol. Also other acid such as $H_3PO_4$ or organic acids such as acetic may be substituted for the hydrochloric acid. Similarly other alkalis such as KOH, $Na_2CO_3$, etc. may be used for neutralization.

It is also considered to be obvious from the examples set forth that the temperature of hydrolysis may embrace a wide range and should be selected in accordance with the normality of the solution to avoid tendency towards coloration.

It is apparent from the foregoing that hydrolyzing in the raw ferment eliminates the necessity of (1) adding a precipitating agent to the raw ferment to render the impurities insoluble, (2) the precipitation step for the removal of the impurities, (3) the necessity for redissolving the gum dextran, (4) the necessity of washing the gum dextran to insure of completeness of impurity removal, and (5) the necessity for neutralizing the aqueous solution of step 3. Thus not only is considerable time saved but material and equipment costs are reduced and a considerable saving of production space is effected.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

I claim:

1. A process for producing hydrolyzed dextran directly from native dextran as contained in a crude fermentate resulting from the cultivation of bacteria selected from the group consisting of *Leuconostoc mesenteroides* and *Leuconostoc dextranicum* in a sucrose-containing medium, which consists of the steps of diluting the fermentate with water and acidifying it to a normality of between 1 and about 5, heating the acidified fermentate at a temperature between about 37 degrees C and 85 degrees C, for between about 35 minutes and 60 hours, the pH, temperature and heating time being correlated so that no substantial coloration develops in the fermentate during heating thereof, adding alkali to the fermentate while it is in the heated condition to adjust the pH thereof to about 6.8–7.0, cooling the resulting solution, de-colorizing, de-ionizing and clarifying the same, precipitating the hydrolyzed dextran directly from the cooled clarified solution and filtering off the precipitated dextran.

2. A process for producing hydrolyzed dextran directly from a crude fermentate obtained by enzymatic action on a sucrose-containing medium in the presence of bacteria, which consists of the steps of diluting the fermentate with water and acidifying it to a normality of about 5, heating the acidified fermentate at a temperature of about 37 degrees C. for about 9 hours, adding alkali to the fermentate while it is in the heated condition, to adjust the pH thereof to about 6.8–7.0, cooling the resulting solution, decolorizing, de-ionizing and clarifying the same, precipitating the hydrolyzed dextran directly from the cooled, clarified solution and filtering off the precipitate.

3. A process for producing hydrolyzed dextran directly from native dextran as contained in a crude fermentate resulting from the cultivation of bacteria selected from the group consisting of *Leuconostoc mesenteroides* and *Leuconostoc dextranicum* in a sucrose- containing medium, which consists of the steps of diluting the fermentate with water and acidifying it to a normality of about 2, heating the acidified fermentate at about 37 degrees C. for about 24 hours, adding alkali to the fermentate, while it is in the heated condition, to adjust the pH thereof to about 6.8–7.0, cooling the resulting solution, decolorizing, de-ionizing and clarifying the same, precipitating the hydrolyzed dextran directly from the cooled, clarified solution and filtering off the precipitated dextran.

4. A process for producing hydrolyzed dextran directly from native dextran as combined in a crude fermentate resulting from the cultivation of bacteria selected from the group consisting of Leuconostoc mesenteroides and Leuconostoc dextranicum in a sucrose-containing medium, which consists of the steps of diluting the fermentate with water and acidifying it to a normality of about one, heating the acidified fermentate at about 37 degrees C. for about 60 hours, adding alkali to the fermentate, while it is in the heated condition, to adjust the pH thereof to about 6.8–7.0, cooling the resulting solution, decolorizing, de-ionizing and clarifying the same, precipitating the hydrolyzed dextran directly from the cooled, clarified solution and filtering off the precipitated dextran.

5. A process for producing hydrolyzed dextran directly from native dextran as contained in a crude fermentate resulting from the cultivation of bacteria selected from the group consisting of *Leuconostoc mesenteroides* and *Leuconostoc dextranicum* in a sucrose-containing medium, which consists of the steps of diluting the fermentate with water and acidifying it to a normality of about 2, heating the acidified fermentate at about 50 degrees C. for about 24 hours, adding alkali to the fermentate, while it is in the heated condition, to adjust the pH thereof to about 6.8–7.0, cooling the resulting solution, decolorizing, de-ionizing and clarifying the same, precipitating the hydrolyzed dextran directly from the cooled, clarified solution and filtering off the precipitated dextran.

6. A process as in claim 1, further characterized in that a mineral acid is added to the fermentate to adjust it to a normality between 1 and 5.

7. A process as in claim 1, further characterized in that hydrochloric acid is added to the fermentate to adjust it to a normality between about 1 and 5.

8. A process as in claim 1, further characterized in that sulfuric acid is added to the fermentate to adjust it to a normality between about 1 and 5.

9. A process as in claim 1, further characterized in that the hydrolyzed dextran is precipitated by the addition of isopropyl alcohol to the cooled fermentate.

References Cited in the file of this patent

UNITED STATES PATENTS

| Number | Name | Date |
|---|---|---|
| 2,203,702 | Staley | June 11, 1940 |
| 2,392,258 | Owen et al. | Jan. 1, 1946 |
| 2,437,518 | Gronwall | Mar. 9, 1948 |
| 2,565,507 | Lockwood | Aug. 28, 1951 |

OTHER REFERENCES

Fowler et al., Canadian J. Research, 15, 1937, pp. 486–490.

The Lancet, Jan. 22, 1949, pp. 132–143.

Evans et al., "Advances in Carbohydrate Chemistry," vol. 2, page 216.